United States Patent Office 3,335,175
Patented Aug. 8, 1967

3,335,175
PRODUCTION OF BORONIC ACIDS
AND ALCOHOLS
Tillmon H. Pearson, Baton Rouge, La., assignor to Ethyl Corporation, New York, N.Y., a corporation of Virginia
No Drawing. Filed Mar. 31, 1964, Ser. No. 356,081
8 Claims. (Cl. 260—500)

This invention relates to a novel and unique process for producing compounds having utility in the chemical and allied arts.

In particular, this invention relates to a process for co-producing boronic acids and alcohols.

The principal object of the instant invention is to provide a process whereby boronic acids having the general formula

and alcohols having the general formula

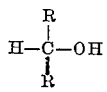

are co-produced in high yields and purity. Other objects will be apparent from the ensuing description.

The above and other objects of this invention are accomplished by the provision of a process comprising reacting an alpha hydroxyborinic acid with a base, preferably, a strong base, e.g., caustic, in an aqueous system at a temperature within the range of from about 25° C. (room temperature) to about 200° C., especially from about 50° C. to about 110° C., for a time sufficient to produce a boronic acid and an alcohol represented by the above general formulas. It appears that this is the only process which will produce both of these useful products via a single reaction.

The present process is preferably conducted in a liquid phase inasmuch as it is more expeditious and simplifies the necessary reaction equipment which in turn provides an economic advantage.

The pressure at which the present process is conducted is not critical. Generally, only that pressure slightly above the vapor pressure of the reaction system need be employed so as to keep it in an essentially liquid state. In most instances atmospheric pressure or slightly above, viz., up to 20 p.s.i., is suitable, however when operating at the higher point of the temperature range recited above, pressures up to 100 p.s.i. may desirably be employed.

The alpha hydroxyborinic acid reactants employed in the process of this invention have the general formula

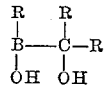

wherein the R groups are hydrocarbon radicals containing up to and including about 18 carbon atoms each and are selected from the group consisting of alkyl, alkynyl, cycloalkyl, aryl, alkaryl, and aralkyl radicals. The most preferred alpha hydroxyborinic acid reactants are those wherein R is a lower alkyl group, viz., those containing up to and including about 6 carbon atoms each, especially those wherein the alkyl groups are identical. These preferred alpha hydroxyborinic acids are easier to produce, especially in high purity, and hence offer a cost advantage. An attractive manner of preparing such compounds is that as described in my copending application Ser. No. 207,056 which discloses a process for producing novel alpha-hydroxyborinic acids by reacting a trihydrocarbon borane with carbon monoxide in the presence of water.

Typical alpha hydroxyborinic acids that are employed in the process of this invention are:

methyl(2-hydroxy-2-propyl)borinic acid,
methyl(2-hydroxy-2-butyl)borinic acid,
methyl(2-hydroxy-3-methyl-2-butyl)borinic acid,
methyl(3-hydroxy-3-pentyl)borinic acid,
methyl(3-hydroxy-3-hexyl)borinic acid,
methyl(2-hydroxy-2-hexyl)borinic acid,
methyl(2-hydroxy-4-methyl-2-pentyl)borinic acid,
methyl(2-hydroxy-3-methyl-2-pentyl)borinic acid,
methyl(2-hydroxy-3,3-dimethyl-2-butyl)borinic acid,
4-bromobutyl(2-hydroxy-2-propyl)boronic acid,
methoxymethyl(2-hydroxy-1-methoxy-2-propyl) borinic acid,
ethyl(2-hydroxy-2-butyl)borinic acid,
ethyl(2-hydroxy-2-pentyl)borinic acid,
ethyl(3-hydroxy-3-pentyl)borinic acid,
ethyl(3-hydroxy-3-hexyl)borinic acid,
propyl(2-hydroxy-2-propyl)borinic acid,
propyl(4-hydroxy-4-heptyl)borinic acid,
2-propyl(3-hydroxy-2,4-dimethyl-3-pentyl)borinic acid,
2-methylpropyl(4-hydroxy-2,6-dimethyl-4-heptyl) borinic acid,
butyl(5-hydroxy-5-nonyl)borinic acid,
pentyl(2-hydroxy-2-butyl)borinic acid,
pentyl(6-hydroxy-6-hendecyl)borinic acid,
hexyl(7-hydroxy-7-tridecyl)borinic acid,
decyl(5-hydoxy-2-methyl-3-ethyl-5-decyl)borinic acid,
docosanyl(11-hydroxy-11-heneicosyl)borinic acid,
butenyl(3-hydroxy-3-butyl)borinic acid,
cyclohexyl(dicyclohexylhydroxymethyl)borinic acid,
methyl(1-hydroxy-1-benzylethyl)borinic acid,
benzyl(2-hydroxy-1,3-dibenzyl-2-propyl)borinic acid,
and the like.

As brought out above, the second reactant to be employed in the instant process is a base which is preferably a strong base. Suitable bases are for example, metal hydroxides, such as the alkali metal hydroxides: e.g., the hydroxides of lithium, sodium, potassium, rubidium, and cesium; and alkaline earth metal hydroxides, e.g., the hydroxides of magnesium, calcium, strontium, and barium. Of these, the alkali metal hydroxides, especially sodium hydroxide, are preferred since they are the most efficacious and are readily available.

It can be understood that the boronic acids and alcohols produced by the process of this invention are directly dependent on the particular alpha-hydroxy borinic acid reactant employed. While not desiring to be bound by theoretical considerations, it is believed that the alpha-hydroxy borinic acid reacts in accordance with the following equation

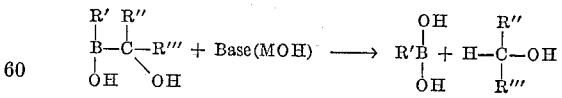

As noted in the above equation, the boronic acid end product is apparently derived from the R' radical and the alcohol end product comprises the R" and R'" radicals. For example, when employing methyl(2-hydroxy-2-propyl)borinic acid in the process of this invention, the end products are methyl boronic acid and isopropyl alcohol. On the other hand, when employing methyl(2-hydroxy-2-butyl)borinic acid, the end products are methyl boronic acid and sec-butyl alcohol.

The amount of base material present during the reaction can vary over a wide range just as long as there are sufficient hydroxyl groups present to form the desired end products. For example, as little as 0.01 mole of base per mole of the borinic acid reactant in an aqueous solution need be present in order for the reaction to occur. However, at lower concentrations the reaction rate is slow and hence it is preferred to utilize from about 1 to about 10 moles of base per mole of borinic acid reactant. A more preferred ratio is from about 2 to about 3 moles of base per mole of borinic acid reactant since within this range, reaction rates are maximized while still providing for ease of separation of the end products.

Pursuant to the present process, the end products are generally separated from each other by phase separation. The end product alcohol usually constitutes the upper layer in which case the lower layer being an aqueous solution containing the boronic acid. In the preferred embodiment of the present invention, the boronic acid is obtained as the metal salt of the respective boronic acid which can be readily isolated by reacting with a stronger acid and then filtering, except for the lower members, e.g., methyl boronic acid, which is water soluble in which case solvent extraction can be employed.

The boronic acids produced by the instant process are characterized as colorless solids. They are insoluble in water except for the lower members.

Alcohols produced by the instant process are characterized as being secondary monohydroxy alcohols of exceptionally high purity.

The following examples are presented wherein all parts are by weight unless otherwise specified.

*Example I*

The boronic acid reactant was prepared in situ by charging 50 parts of triethylborane and 50 parts of deaerated water to a reaction vessel equipped with means for agitation. The vessel was then sealed and while the contents of the vessel were continuously agitated, carbon monoxide was injected into the liquid mass within the reactants until a pressure of approximately 1000 p.s.i. was obtained. After about 15 minutes, the pressure was noted to have dropped to 790 p.s.i. whereupon pressure in the reactor was adjusted upward to 1350 p.s.i. by the further addition of carbon monoxide. After an additional 45 minutes the pressure in the reactor was noted to have fallen to 1230 p.s.i. Again, the pressure was adjusted upward, this time to 1660 p.s.i. After about 30 minutes the pressure in the reactor was noted to be holding fairly constant at approximately 1640 pounds per square inch. This indicated that the reaction was essentially complete whereupon agitation was discontinued. The contents of the reactor were allowed to stand for a short period of time to phase separate into layers. The lower aqueous layer was removed from the reaction vessel and the upper clear liquid layer which was ethyl(3-hydroxy-3-pentyl) borinic acid was retained.

A 20 percent aqueous solution of sodium hydroxide in the ratio of 2 parts of sodium hydroxide to 1 part of borinic acid was then charged into the reaction vessel. Heat was applied and the mixture was refluxed under nitrogen for approximately 1 hour. After this period of time, heating was discontinued and the reaction mixture allowed to phase separate into two distinct layers. The upper layer was a clear liquid which upon analysis was found to be 3-pentanol realized in essentially quantitative yield. The lower layer was an essentially clear liquid which upon analysis was found to be a solution of the sodium salt of ethylboronic acid.

Repetition of the procedure of Example I utilizing 1 part of lithium hydroxide to 1 part of octyl (9-hydroxy-9-heptadecyl)borinic acid yields 9-heptadecyl alcohol and octylboronic acid.

Correspondingly, repetition of the procedure of Example I utilizing 4 parts of calcium hydroxide to 1 part of 3-butenyl-(5-hydroxy-5-1,8-nonadienyl)borinic acid yields 5-1,8-nonadienyl alcohol and 3-butenylboronic acid.

*Example II*

In this run, 2-methylpropyl(4-hydroxy-2,6-dimethyl-4-heptyl)borinic acid was utilized as a starting material. It was prepared by charging 18 parts of triisobutyl borane and 25 parts of deaerated water into a reaction vessel which was then sealed and a quantity of high pressure carbon monoxide injected therein sufficient to raise the pressure in the reactor to 2100 p.s.i. After about 2 hours the pressure in the reactor leveled out to approximately 1800 p.s.i. Upon phase separation, the lower phase was removed and the upper phase borinic acid allowed to remain in the reactor.

A 20 percent aqueous solution of sodium hydroxide was then added to the borinic acid in the reactor at a ratio of about 2 parts of sodium hydroxide to about 1 part of borinic acid. This mixture was then refluxed for about 4 hours after which the mixture was allowed to phase separate. The top clear liquid layer was analyzed and found to be 2,6-dimethyl-4-heptyl alcohol. The lower phase upon analysis was found to be isobutylboronic acid sodium salt in solution.

Repeating the above procedure utilizing only 0.01 part of sodium hydroxide per part of borinic acid produces similar results except that it requires a much greater reaction time.

When the above procedure of Example II is again repeated utilizing dodecyl(13-hydroxy-13-pentacosyl)borinic acid as the starting material, 13-pentacosyl alcohol and dodecylboronic acid are realized.

Moreover, when substituting phenyl(diphenyl hydroxy methyl)borinic acid for 2-methylpropyl(4-hydroxy-2,6-dimethyl-4-heptyl)borinic acid in the above procedure, diphenylmethyl alcohol and phenylboronic acid are realized.

*Example III*

In this run, n-hexyl(7-hydroxy-7-tridecyl)borinic acid is utilized as a starting material and is prepared by reacting tri-n-hexylborane with carbon monoxide in the presence of water. The n-hexyl(7-hydroxy-7-tridecyl)borinic acid obtained as above was then reacted with a 20 percent aqueous solution of sodium hydroxide at a ratio of 3 parts of the latter to 1 part of the borinic acid. After reaction completion, the mixture was allowed to phase separate and the upper layer upon analysis was found to be 7-tridecyl alcohol and the lower phase was found to contain n-hexylboronic acid as the sodium salt.

Following the above procedure, utilizing octadecyl(19-hydroxy-19-heptatriacontyl)borinic acid as a starting material produces 19-heptatriacontyl alcohol and octadecylboronic acid.

Following the procedure of Example III above, when n-hexyl(7-hydroxy-7-tridecyl)borinic acid is reacted with calcium hydroxide in a ratio of 10 parts of the latter to 1 part of the borinic acid, similar results are obtained.

*Example IV*

Cyclohexyl (dicyclohexylhydroxymethyl) borinic acid was first prepared by reacting tricyclohexylborane with carbon monoxide in the presence of water. The resultant borinic acid was then refluxed under nitrogen with a 10 percent aqueous solution of sodium hydroxide. The sodium hydroxide was present at a ratio of about 3 parts thereof to every part of the borinic acid. After about 3 hours of refluxing, the reaction mixture was then allowed to phase separate. The upper clear liquid layer upon analysis was found to be dicyclohexylmethyl alcohol and the lower layer was found to be the sodium salt of cyclohexylboronic acid.

Repetition of the above procedure utilizing magnesium hydroxide in lieu of sodium hydroxide at a ratio of 0.5 part thereof to 1 part of borinic acid produces similar results.

Typical of the boronic acids prepared pursuant to this process are: methylboronic acid, ethylboronic acid, propyl-boronic acid, 2-methylpropylboronic acid, butylboronic acid, pentylboronic acid, decylboronic acid, docosanylboronic acid, butenylboronic acid, benzylboronic acid, 4-bromobutylboronic acid, methoxymethylboronic acid, and the like.

Exemplary of the diverse alcohols produced in high yield pursuant to the practice of this invention are: 2-propyl alcohol, 2-butyl alcohol, 2-pentyl alcohol, 3-pentyl alcohol, 2-hexyl alcohol, 3-hexyl alcohol, 2-methyl-3-pentyl alcohol, 2-heptyl alcohol, 3-heptyl alcohol, 4-heptyl alcohol, 3(2-methyl-4-methyl)pentyl alcohol, 3(2,2-dimethyl)pentyl alcohol, 3(4-methyl)hexyl alcohol, 5-nonyl alcohol, 7-tridecyl alcohol, 9-heptadecyl alcohol, 10-nonadecyl alcohol, and the like.

Alcohols produced pursuant to the present process are ideally suited for such conventional uses as solvents, as a plasticizer, intermediates for the production of other chemicals, e.g., in the production of detergents, and the like. Boronic acids prepared by the instant process also find diverse uses, for example, they can be readily oxidized to produce alcohols that have heretofore been dfficult to produce.

I claim:

1. The process of producing boronic acid and alcohol, which comprises reacting in an aqueous system, the reactants consisting of
   (1) an alpha hydroxyborinic acid having the formula

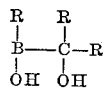

wherein R represents hydrocarbon groups each having up to 18 carbon atoms and
   (2) a base selected from the group consisting of alkali metal hydroxides and alkaline earth metal hydroxides at a temperature ranging from about 25° C. to about 200° C. for a time sufficient to produce said boronic acid and alcohol.

2. The process of claim 1 wherein said base is an alkaline earth metal hydroxide.

3. The process of claim 1 wherein said base is an alkali metal hydroxide.

4. The process of claim 1 wherein said base is sodium hydroxide.

5. The process of claim 1 wherein the hydrocarpon groups of the alpha-hydroxyborinic acid are alkyl groups, each containing up to about 18 carbon atoms.

6. The process of claim 1 wherein said alpha-hydroxyborinic acid is ethyl(3-hydroxy-3-pentyl)borinic acid.

7. The process of claim 1 wherein said alpha-hydroxyborinic acid is 2-methylpropyl(4-hydroxy-2,6-dimethyl-4-heptyl)-borinic acid.

8. The process of claim 1 wherein said temperature ranges from about 50° C. up to about 110° C.

References Cited

UNITED STATES PATENTS 3,277,176    10/1966    Pearson.

LEON ZITVER, *Primary Examiner.*

J. E. EVANS, *Assistant Examiner.*